United States Patent
Sawata et al.

(10) Patent No.: US 11,859,623 B2
(45) Date of Patent: Jan. 2, 2024

(54) COOLING SYSTEM FOR ELECTRIC MACHINES

(71) Applicant: Hamilton Sundstrand Corporation, Charlotte, NC (US)

(72) Inventors: Tadashi Sawata, Coventry (GB); Aaron Day, Borough Green (GB)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 82 days.

(21) Appl. No.: 17/212,140

(22) Filed: Mar. 25, 2021

(65) Prior Publication Data

US 2021/0317835 A1 Oct. 14, 2021

(30) Foreign Application Priority Data

Apr. 9, 2020 (GB) .................................... 2005311

(51) Int. Cl.
*H02K 9/00* (2006.01)
*F04D 25/08* (2006.01)

(52) U.S. Cl.
CPC ............ *F04D 25/082* (2013.01); *H02K 9/00* (2013.01)

(58) Field of Classification Search
CPC .................................. H02K 9/00; H02K 9/04
USPC .............................................. 310/52, 62, 63
See application file for complete search history.

(56) References Cited

U.S. PATENT DOCUMENTS

| | | | |
|---|---|---|---|
| 5,519,269 A * | 5/1996 | Lindberg | H02K 9/19 310/58 |
| 7,839,031 B2 | 11/2010 | Tilton et al. | |
| 8,482,167 B2 | 7/2013 | Erfanfar et al. | |
| 9,903,666 B2 | 2/2018 | Pal et al. | |
| 2016/0118863 A1* | 4/2016 | Pal | H02K 9/20 310/54 |

FOREIGN PATENT DOCUMENTS

| | | | | |
|---|---|---|---|---|
| CN | 105703541 A | * | 6/2016 | |
| CN | 105871125 A | * | 8/2016 | ............... H02K 1/20 |
| CN | 105871125 A | | 8/2016 | |
| CN | 108258849 A | * | 7/2018 | ............... H02K 1/20 |
| CN | 108539928 A | * | 9/2018 | ............... H02K 5/04 |
| CN | 108539928 A | | 9/2018 | |
| CN | 208966498 U | * | 6/2019 | |
| CN | 208966498 U | | 6/2019 | |
| CN | 110311504 A1 | * | 10/2019 | ............... H02K 1/16 |
| JP | 2002017071 A | | 1/2002 | |
| JP | 2004180479 A | * | 6/2004 | |
| JP | 2004180479 A | | 6/2004 | |

OTHER PUBLICATIONS

CN105871125A Abstract.
CN208966498U Abstract.
Intellectual Property Office Search Report for International Application No. GB 2005311.2 dated Sep. 14, 2021, 4 pages.
JP2002017071A Abstract.
JP2004180479A Abstract.
Abstract of CN1085539928A.

* cited by examiner

*Primary Examiner* — Jose A Gonzalez Quinones
(74) *Attorney, Agent, or Firm* — CANTOR COLBURN LLP

(57) ABSTRACT

A cooling system for an electric motor includes means for mixing water with cooling air applied to the motor. The water is preferably provided as a mist of water droplets sprayed into cooling air e.g. cooling air generated by a propulsive element being driven by the motor.

4 Claims, 3 Drawing Sheets

COOLING SYSTEM FOR ELECTRIC MACHINES

FOREIGN PRIORITY

This application claims priority to United Kingdom Patent Application No. 2005311.2 filed Apr. 9, 2020, the entire contents of which is incorporated herein by reference.

TECHNICAL FIELD

The present disclosure relates to cooling systems for electric machines such as electric propulsion motors.

BACKGROUND

Electric machines or motors are used in a wide range of applications and many of these uses require high power output and high performance. The operation of these machines generates heat which, particularly for more compact machines, needs to be dissipated or removed. Improved power density can be achieved if cooling can be improved.

Motors typically comprise a rotor that rotates relative to a stator. For a permanent magnet machine, typically windings are provided on the stator with permanent magnets provided on the rotor. As the rotor rotates relative to the stator, magnetic fields are created which generate torque on a rotor shaft to drive a mechanical device e.g. a fan or propeller.

A control system is also required to operate the motor. The control system will include power conversion and control circuitry including inverters, converters and the like as is known in the art.

Because of the high power requirements, it is important to cool the motor. Cooling of the control system is also usually required to avoid damage to, and prolong the life of the components.

Air cooling can be used for smaller, less power dense machines, whereby natural or forced/compressed air is provided to cool the machine. For higher power density machines, however, air cooling is often not sufficient to effectively remove the heat generated in the machine. For higher power density machines, liquid cooling is often used. Typical liquid cooling systems use a liquid cooling medium e.g. oil or a water/glycol mix. As this absorbs heat, heat exchangers are required to remove heat from the medium to the environment. These add weight, volume and complexity to the overall machine structure.

Fans, water cooling systems, heat sinks and heat exchangers are also known for cooling control circuitry, but again, such motor structures can be large and heavy due to the need for the motor components, the control components and their respective cooling systems.

One application where electric machines are used for high performance is as electric propulsion motors e.g. for vehicles or aircraft e.g. in a turbofan assembly or other propulsion assembly, to drive a fan or propeller. These require intensive cooling for improved power density. It is desirable that such systems are as small, simple and lightweight as possible.

There is a need for a simple, light, small cooling system for high power density electric motors that avoids the need for heat exchangers or the like.

SUMMARY

The present disclosure provides a cooling system for an electric motor whereby water is mixed with cooling air to cool the motor.

The water is preferably mixed with the air by spraying a water mist from nozzles into the cooling air.

In a most efficient embodiment, the cooling air is or includes air created by the propulsion element being driven by the motor.

Also provided is a method of cooling an electric motor using a mixture of water and cooling air.

Preferred features will now be described by way of example only, with reference to the drawings.

DETAILED DESCRIPTION

The described embodiments are by way of example only. The scope of this disclosure is limited only by the claims.

Although the concepts of this disclosure can be applied to any electric motors, they will be described, by way of example, in relation to a propulsion motor for driving a propulsive element e.g. a propeller or a fan.

Figure 1:
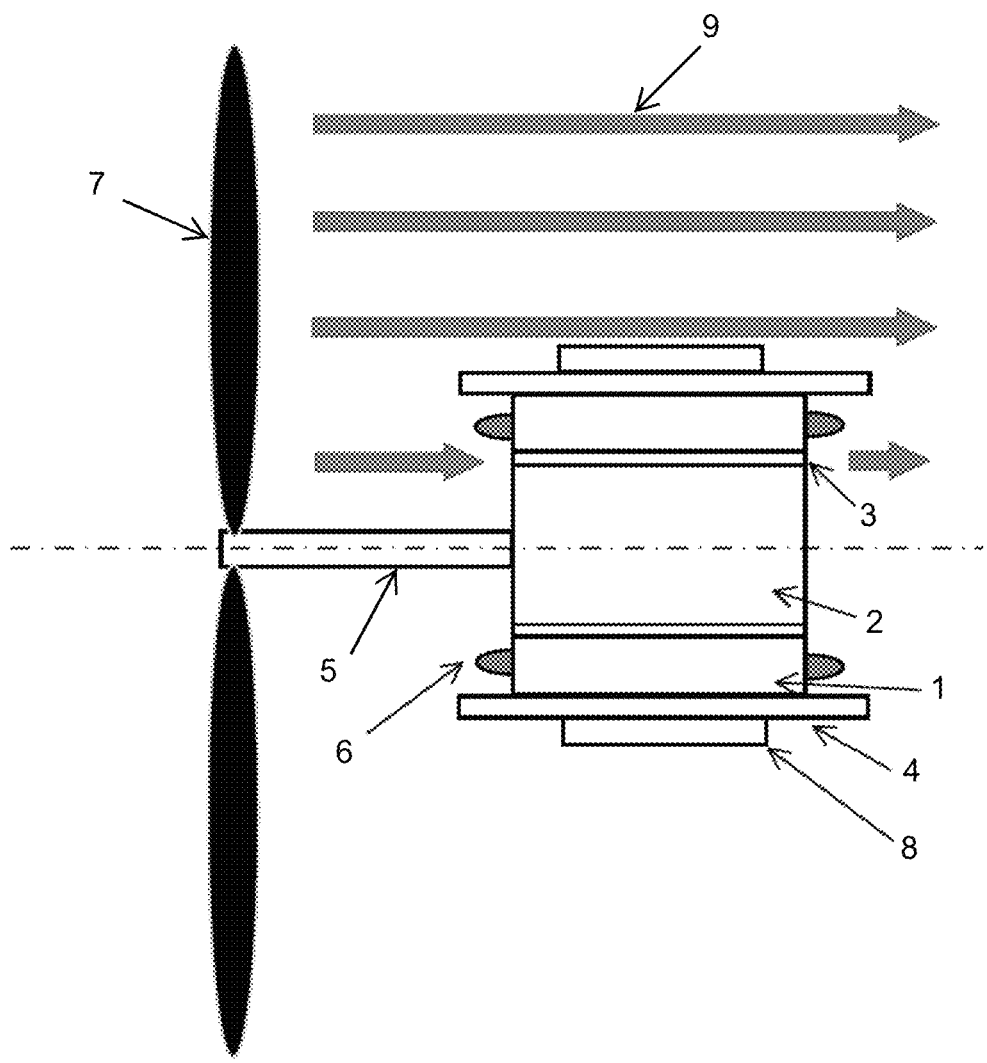
FIG. 1 is a schematic view of a propulsion motor cooled by propulsive air.

Air cooling will be described first with respect to FIG. 1. Shown in FIG. 1 is a typical electric motor 10 comprising a stator 1 and a rotor 2, separated by an air gap 3, and mounted in a housing 4, for rotating a shaft 5. Windings 6 are provided on the stator 1. Rotation of the rotor 2 relative to the stator 1 generates power to rotate the shaft 5. A propulsive element e.g. a propeller or fan 7 is mounted to the shaft for rotation with the shaft. Heat is generated by the operation of the motor and this needs to be dissipated to avoid overheating or damage to the components. As mentioned above, various cooling mechanisms are known. In the system of FIG. 1, cooling fins 8 are provided on the outer surface of the housing 4 and air 9 is caused to flow across the cooling fins 8 to cool the motor 10.

Different sources of air can be used to provide the cooling air. In the example shown, the propulsive air flow, i.e. the air flow through the propeller or fan is employed as cooling air 9.

As mentioned above, although such systems are lightweight and compact and simple, the cooling effect that can be provided by air is not sufficient to effectively cool high power density motors.

The solution provided by this disclosure involves improving the performance of air cooled systems by mixing water to the cooling air. Water has a significantly higher specific heat coefficient than air for similar flow conditions thus providing an improved cooling effect. This will be described by way of example with reference to FIGS. 2 and 3.

Figure 2:
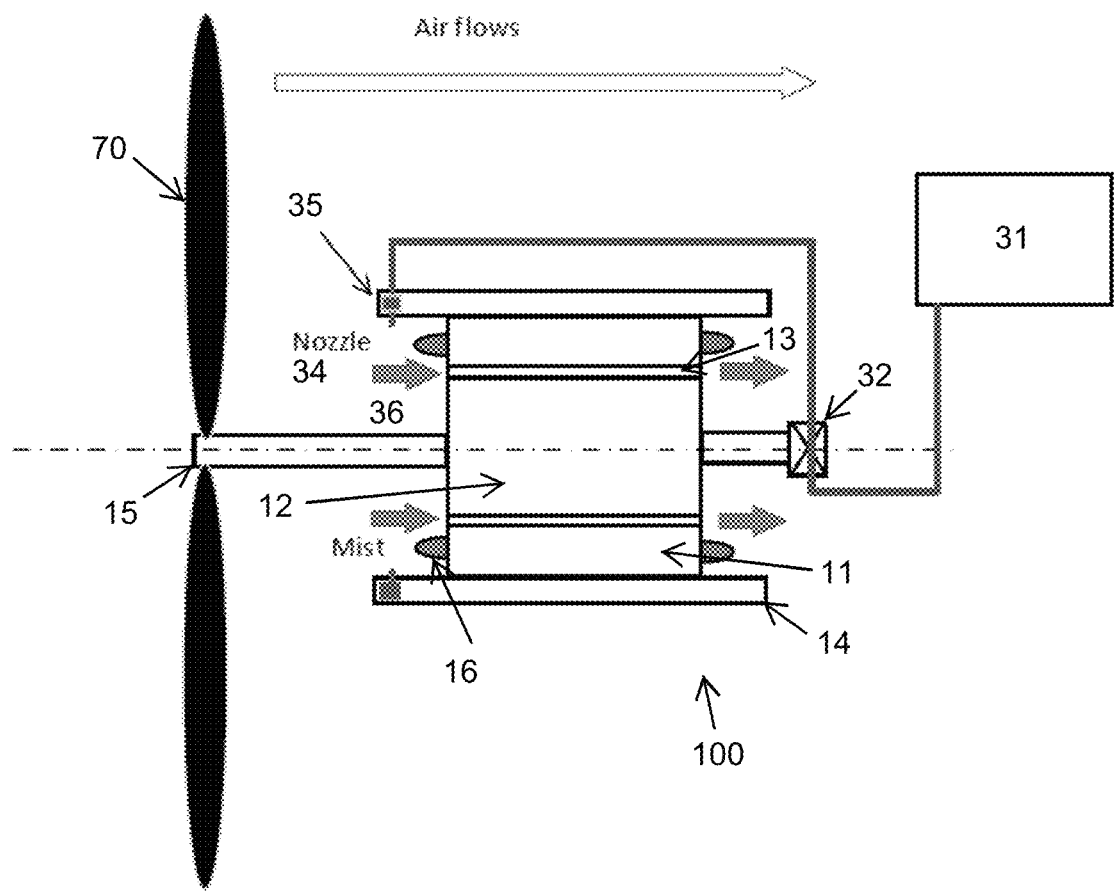
FIG. 2 is a schematic view of a propulsion motor cooled by a cooling system according to the present disclosure.
Figure 3:
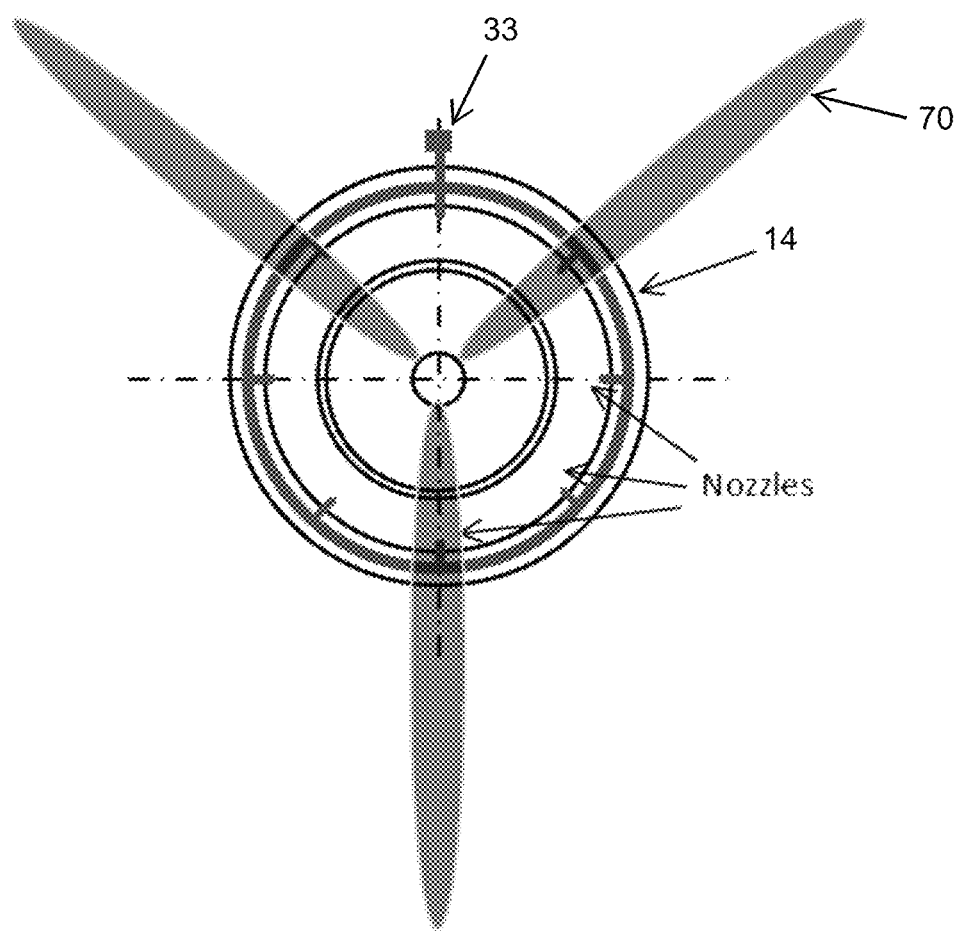
FIG. 3 is a front view of the system of FIG. 2

FIG. 2 shows a propulsive motor 100 driving a propeller or fan 70 by means of a shaft 50, caused to rotate due to the operation of the motor 100. As with the system shown in FIG. 1, electric motor 100 comprising a stator 11 and a rotor 12, separated by an air gap 13, and mounted in a housing 14, for rotating a shaft 15. Windings 16 are provided on the stator 11. Rotation of the rotor 12 relative to the stator 11 generates power to rotate the shaft 15. A propulsive element e.g. a propeller or fan 70 is mounted to the shaft for rotation with the shaft. Heat is generated by the operation of the motor and this needs to be dissipated to avoid overheating or damage to the components.

As mentioned above, the concept of this disclosure that will be further described below will also be applicable to different electric motor structures including, but not limited to motors with an inner stator and an outer rotor, different permanent magnet or synchronous machines etc. The concepts are also not limited to use with propulsion machines and can be used to cool any type of motor or machine.

Air 30 is directed towards the motor 100. In the most general form of the disclosure, the air can be provided from any air supply but in the preferred example, as shown, the air 30 comes from the propulsive air flow of the propulsive element 70 and is directed towards the motor from the propulsive element 70 as shown. To improve the cooling, water is mixed with the air as it is provided to the motor so that motor is cooled by an air/water mix. The water is preferably provided to the air as a fine mist or spray.

In a preferred example, as shown, the water is provided from a water tank 31 that may be provided in proximity with or more remotely from the motor. The water can be directed from the tank, e.g. via a pump 32 or other means for conveying the water, via a water supply pipe 33 and is then passed through one or more nozzles 34 to a location relative to the motor where it is mixed with air to cool the motor. Preferably, the nozzles are formed in the motor housing 14 and several nozzles can be distributed around the housing as shown best in FIG. 3.

The housing 14 may be provided with grooves or channels 35 to distribute the water to the nozzles 34.

To increase efficiency, the water may be provided from the tank 31 to the nozzles 34 via a pump 32 that pressurises the water supply system. In a most efficient example, the pump 32 can be driven by the engine shaft 15 and can be housed within the motor housing, thus reducing the need for external components.

Using nozzles to provide the added water in the form of a mist provides a more improved cooling effect as the smaller droplets will evaporate quickly. The evaporation cooling effect means that the cooling system can perform up to five times better than known air cooling systems, depending on the size of the water droplets. It should be possible to determine an optimum droplet size.

Although a water tank or reservoir 31 is needed, which will add some volume and weight to the overall system, the volume of water required will be relatively small especially as the water is provided in the form of a fine mist and so for the benefit provided overall, the additional structure is not significant. The volume of water required can be further reduced in a preferred embodiment where water is only added to the cooling air at specific times/flight conditions. For example, the system may be arranged to only use water/air cooling at times when the motor requires high output power e.g. during take-off. At other times of flight, air cooling alone might be sufficient. Various ways of controlling the operation of the pump 32 have been considered by the inventors. The pump and/or the nozzles may be controlled based on e.g. rotation of the shaft 15 so that water is only used at certain times.

Whilst water is known to cause corrosion, this, again, should not be a major concern with this system since the water mixed with the cooling air would be evaporated quickly from the hot surfaces of the motor. The windings 16 could be impregnated and/or potted to protect from the water and the stator core could be provided with a protective coating if needed.

The cooling system of this disclosure has the advantage that a motor can be thermally sized as an air cooled machine usually used for lower power requirements but its thermal performance can be boosted by the improved cooling effect.

The disclosure provides a system which provides effective cooling and allows electric motors to have high power density without the need for a liquid cooling system including e.g. heat exchangers and other large and heavy components. The system can also be used as a means to significantly enhance the overload capability of air cooled motors. In the preferred embodiment, the propulsive air flow itself can be used to contribute to the cooling.

The invention claimed is:

1. A cooling system, the system comprising:
   a motor that includes a motor housing with channels formed therein;
   a propulsion element that is driven by the motor, wherein the propulsion element generates cooling air and directs it at an end face of the motor;
   a water tank;
   means for mixing water with the cooling air generated by the propulsion element being driven by the motor, applied to the motor the means comprising:
     one or more nozzles in fluid communication with the channels;
     a pump in fluid communication with the water tank; and
     a water supply line arranged between the pump and the housing device and the water tank to provide water from the tank to the channels where the water is distributed to the one or more nozzles, wherein the nozzles are arranged to spray water in the form of a water mist into the flow of cooling air from the propulsion element to the end face of the motor.

2. The system of claim 1, further comprising:
   a controller to control the mixing of water according to an operating state of the motor.

3. A method of cooling an electric motor using a system as claimed in claim 1, the method comprising:
   directing the mixture of water and cooling air to the motor.

4. The system of claim 1, wherein the propulsion element is outside of the motor housing.

* * * * *